US009967112B2

United States Patent
Tabet et al.

(10) Patent No.: US 9,967,112 B2
(45) Date of Patent: May 8, 2018

(54) APPARATUS AND METHODS FOR ADAPTIVELY RESUMING RADIO CHANNEL ESTIMATION

(71) Applicant: Apple Inc., Cupertino, CA (US)

(72) Inventors: Tarik Tabet, San Jose, CA (US); Navid Damji, San Jose, CA (US); Kee-Bong Song, San Diego, CA (US); Syed Aon Mujtaba, San Clara, CA (US); Johnson Sebeni, Fremont, CA (US); Zhu Ji, San Jose, CA (US)

(73) Assignee: APPLE INC., Cupertino, CA (US)

(*) Notice: Subject to any disclaimer, the term of this patent is extended or adjusted under 35 U.S.C. 154(b) by 0 days. days.

(21) Appl. No.: 13/887,207

(22) Filed: May 3, 2013

(65) Prior Publication Data

US 2013/0322586 A1    Dec. 5, 2013

Related U.S. Application Data

(60) Provisional application No. 61/642,304, filed on May 3, 2012.

(51) Int. Cl.
*H04L 25/00* (2006.01)
*H04L 25/02* (2006.01)

(52) U.S. Cl.
CPC ...... *H04L 25/0206* (2013.01); *H04L 25/0212* (2013.01); *H04L 25/0256* (2013.01); *H04L 25/0224* (2013.01)

(58) Field of Classification Search
CPC ............... H04W 72/12; H04L 25/0206; H04L 25/0212; H04L 25/0256; H04L 25/02224
(Continued)

(56) References Cited

U.S. PATENT DOCUMENTS 6,314,131 B1 * 11/2001 Roe ............... H04L 25/0232
370/342
8,731,605 B1 * 5/2014 Shetty ............... H04W 48/18
455/435.2
(Continued)

FOREIGN PATENT DOCUMENTS

WO    WO 2012089239 A1 *    7/2012    ........... H04B 7/0851

OTHER PUBLICATIONS

Karakaya, B et al, "Channel Estimation for LTE Uplink in High Doppler Spread," Wireless Communications and Networking Conference, 2008. WCNC 2008. IEEE , vol., No., pp. 1126,1130, Mar. 31, 2008-Apr. 3, 2008.*

(Continued)

*Primary Examiner* — Chieh M Fan
*Assistant Examiner* — Berhanu Tadese
(74) *Attorney, Agent, or Firm* — Fay Kaplun & Marcin, LLP (57) ABSTRACT

Methods and apparatus for resuming radio channel measurements and estimations after an interruption in reception. In one exemplary embodiment of the present disclosure, an adaptive solution is provided for channel estimation based at least in part on the reception interruption duration. In one variant, an LTE UE determines a windowing length and/or "shape" for a time domain channel estimation algorithm based on at least the interruption duration. In an alternate variant, an LTE UE determines the interpolation coefficients for a filter based on the interruption duration.

21 Claims, 6 Drawing Sheets

(58) Field of Classification Search
USPC .................................................. 375/260, 350
See application file for complete search history.

(56) References Cited

U.S. PATENT DOCUMENTS

| | | | | |
|---|---|---|---|---|
| 8,738,021 B2* | 5/2014 | Mutya | ................... | H04W 88/06 455/452.1 |
| 8,948,126 B2* | 2/2015 | Chin | ................. | H04W 36/0088 370/280 |
| 9,084,262 B2* | 7/2015 | Chin | ................... | H04W 76/048 |
| 2006/0245349 A1* | 11/2006 | Vrcelj | ................. | H04L 25/0216 370/210 |
| 2007/0047499 A1* | 3/2007 | Montojo | ............... | H04L 1/0009 370/335 |
| 2007/0097922 A1* | 5/2007 | Parekh | ................... | H04W 68/12 370/332 |
| 2007/0280363 A1* | 12/2007 | Im | ....................... | H04L 25/0212 375/260 |
| 2009/0103640 A1* | 4/2009 | Chen | ................... | H04L 25/0212 375/260 |
| 2010/0034126 A1* | 2/2010 | Kitazoe | ............. | H04W 72/1268 370/310 |
| 2010/0074317 A1* | 3/2010 | Sun | ...................... | H04L 25/0204 375/232 |
| 2010/0080139 A1* | 4/2010 | Palanki | ................. | H04B 7/2606 370/252 |
| 2011/0002403 A1* | 1/2011 | Wilhelmsson | ........ | H04L 5/0007 375/260 |
| 2011/0228868 A1* | 9/2011 | Hua | ....................... | H04L 25/022 375/260 |
| 2011/0256863 A1* | 10/2011 | Ramasamy | ........... | H04W 24/08 455/424 |
| 2011/0317635 A1* | 12/2011 | Swaminathan | ... | H04W 36/0088 370/329 |
| 2012/0057628 A1* | 3/2012 | Ancora | ............. | H04L 25/03248 375/233 |
| 2012/0294173 A1* | 11/2012 | Su | ......................... | H04W 24/10 370/252 |
| 2012/0294291 A1* | 11/2012 | Su | ...................... | H04W 72/1215 370/336 |
| 2013/0053025 A1* | 2/2013 | Lindoff | ............. | H04W 36/0088 455/424 |
| 2013/0172023 A1* | 7/2013 | Chan | ....................... | H04W 4/14 455/466 |
| 2013/0215869 A1* | 8/2013 | Srinivasan | ............ | H04W 36/14 370/331 |
| 2013/0215945 A1* | 8/2013 | Eitel | ................... | H04L 25/0238 375/224 |
| 2013/0272212 A1* | 10/2013 | Tabet | ................ | H04W 36/0066 370/329 |
| 2013/0272218 A1* | 10/2013 | Cui | ....................... | H04W 72/08 370/329 |
| 2013/0322586 A1* | 12/2013 | Tabet | ................. | H04L 25/0206 375/350 |
| 2014/0016490 A1* | 1/2014 | Tabet | .................... | H04W 24/10 370/252 |

OTHER PUBLICATIONS

Jinfeng Hou; Jian Liu, "A novel channel estimation algorithm for 3GPP LTE downlink system using joint time-frequency two-dimensional iterative Wiener filter," 2010 IEEE 12th International Conference on Communication Technology, Nanjing, 2010, pp. 289-292.*

Somasegaran, Lathaharan, "Channel Estimation and Prediction in UMTS LTE", Aalborg University Institute of Electronic Systems signal and Information Processing for Communications, Feb. 25-Jun. 25, 2007—Internet Citation—The electronic version of this article is can be found online at : http://projekter.aau.dk/projekter/files/10608.*

Xuewu Dai et al., "Kalman interpolation filter for channel estimation of LTE downlink in high-mobility environments", EURASIP Journal on Wireless Communications and Networking, Published: Jul. 25, 2012,—Internet Citation—The electronic version of this article is can be found online at :http://jwcn.eurasipjournals.com.*

Chiueh et al., "OFDM Baseband Receiver Design for Wireless Communications", 2007 John Wiley & Sons (Asia) Pte Ltd. ISBN: 978-0-470-82234-0.*

* cited by examiner

APPARATUS AND METHODS FOR ADAPTIVELY RESUMING RADIO CHANNEL ESTIMATION

PRIORITY AND RELATED APPLICATIONS

This application claims priority to U.S. Provisional Patent Application Ser. No. 61/642,304 filed on May 3, 2012 and entitled "APPARATUS AND METHODS FOR ADAPTIVELY RESUMING RADIO CHANNEL ESTIMATION", the foregoing being incorporated herein by reference in its entirety.

This application is related to co-owned, co-pending U.S. patent application Ser. No. 13/475,482 filed on May 18, 2012, and entitled "APPARATUS AND METHODS FOR CLIENT SERVER INTERACTION IN HYBRID NETWORK ENVIRONMENTS", Ser. No. 13/475,655 filed on May 18, 2012, and entitled "APPARATUS AND METHODS FOR OPTIMIZING SCHEDULED OPERATIONS IN HYBRID NETWORK ENVIRONMENTS", Ser. No. 13/475,802 filed May 18, 2012, and entitled "APPARATUS AND METHODS FOR NETWORK ASSISTED HYBRID NETWORK OPERATION", Ser. No. 13/416,286 filed Mar. 9, 2012, and entitled "DUAL NETWORK MOBILE DEVICE RADIO RESOURCE MANAGEMENT", Ser. No. 13/099,204 filed May 2, 2011, and entitled "SINGLE-RADIO DEVICE SUPPORTING COEXISTENCE BETWEEN MULTIPLE RADIO ACCESS TECHNOLOGIES", Ser. No. 13/438,666 filed Apr. 3, 2012, and entitled "MULTIPLE NETWORK MOBILE DEVICE CONNECTION MANAGEMENT", Ser. No. 13/346,419 filed Jan. 9, 2012, and entitled "DYNAMIC TRANSMIT CONFIGURATIONS IN DEVICES WITH MULTIPLE ANTENNAS", and Ser. No. 13/347,641 filed Jan. 10, 2012, and entitled "MULTIMODE USER EQUIPMENT WITH DUAL CIRCUIT ARCHITECTURE", each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technical Field

The present disclosure relates generally to the field of mobile technology and wireless communications. More particularly, in one exemplary embodiment, the present disclosure is directed to resuming radio channel measurements and estimations after an interruption in reception.

2. Description of Related Technology

Wireless networks are based on transmission and reception of Radio Frequency (RF) electro-magnetic waves between at least two devices. During operation, the RF connection will experience a wide range of undesirable effects and attenuations due to e.g., atmospheric effects, intervening obstacles, etc. In some wireless technologies (such as Long Term Evolution (LTE) cellular networks), channel estimation is used by the transmitter or receiver to determine how to compensate for the radio link effects to maximize signal reception. Improving signal reception can greatly improve device performance, reduce data corruption, and reduce processing complexity (and power consumption).

Certain receiver activities can greatly affect channel estimation accuracy. For example, within LTE cellular networks (and certain other advanced wireless networking technologies), the client device may periodically e.g., tune away from the first network (e.g., LTE) to a second network (e.g., CDMA 2000), go to sleep or idle mode and save power when data traffic is low and/or bursty (e.g., Discontinuous Reception (DRX)), perform measurements on other networks or Radio Access Technologies (RATs) (e.g. gap measurements), handover or "camp" onto other networks, and/or experience RF conditions that will lead to interruption of reception. It should be appreciated by those of ordinary skill in the related arts that the radio channel continues to change while the client device is e.g., tuned away or lacks reception; thus, once the client device tunes back, the device will experience a discontinuity (i.e., the channel has shifted in position and power). Existing devices either accept the performance degradation caused by the discontinuity, or determine a new channel estimate from "scratch."

Consequently, methods and apparatus are needed to improve resumption of radio channel measurements and estimations after an interruption in reception.

SUMMARY

The present disclosure satisfies the aforementioned needs by providing, inter alia, improved apparatus and methods for resuming radio channel measurements and estimations after an interruption in reception.

A method of performing radio channel estimation after an interruption in reception between a mobile device and a network is disclosed. In one embodiment the method includes: determining a duration of the interruption in reception, determining a channel estimation window based at least in part on the duration of the interruption, wherein the channel estimation window is characterized by a channel estimation window length and a channel estimation window shape, and performing channel estimation in accordance with the determined channel estimation window; wherein: when the determined duration is less than a first threshold: the channel estimation window length comprises a first channel estimation window length, and the channel estimation window shape is determined before the interruption in reception, when the determined duration is greater than the first threshold and less than a second threshold: the channel estimation window length comprises a second channel estimation window length and is based at least in part on a noise estimate and a maximum delay spread, and the channel estimation window shape is based at least on an unevenly weighted distribution, and when the determined duration is greater than the second threshold: the channel estimation window length comprises a third channel estimation window length and is based at least in part on a characteristic of a radio channel of the network, and the channel estimation window shape comprises a third channel estimation window shape and is based at least in part on an evenly weighted distribution.

In one variant, the method is implemented within user equipment (UE) of an LTE-enabled cellular network.

A wireless mobile device is disclosed. In one embodiment, the device includes a cellular or other wireless air interface that is configured to adaptively recover from interruptions in reception (e.g., due to tune-away or other such events) so as to enhance user experience and device power consumption.

A computer readable apparatus is disclosed. In one embodiment, the apparatus includes at least one computer program configured to, when executed, implement adaptive reception interruption recovery in e.g., a mobile wireless device.

A method for adaptively determining one or more wireless channel estimation parameters is disclosed. In one embodiment, the method includes utilizing a tiered scheme based on at least a tune-away duration.

A computerized logic configured to intelligently select remedial measures so as to best recover from a reception interruption event is disclosed.

A method of reducing channel recovery latency resulting from a reception interruption event is disclosed.

A method of reducing power consumption in a wireless mobile device is disclosed.

A method of performing radio channel estimation after an interruption in reception between a mobile device and a network is disclosed. In one embodiment, the method includes: determining a duration of the interruption in reception; when the determined duration is less than a first threshold: performing a radio channel estimation for the mobile device using a first window length and a first window shape determined before the interruption in reception; when the determined duration is greater than the first threshold and less than a second threshold: performing the radio channel estimation for the mobile device using an unevenly weighted distribution based, at least in part on a second window length and a second window shape determined at least in part, by a noise estimate and a maximum delay spread; and when the determined duration is greater than the second threshold: performing the radio channel estimation for the mobile device based, at least in part on an evenly weighted distribution a third window length. In one variant, the unevenly weighted distribution comprises at least one of a Gaussian distribution, an exponential distribution, a Hamming distribution, and an evenly weighted distribution like a rectangular window/distribution.

In a second variant, the method further includes: updating a secondary channel estimate based, at least in part, on the performed radio channel estimation.

In a third variant, the first threshold and the second threshold are based, at least in part, on a Doppler shift.

In some cases, performing a radio channel estimation comprises multiplying a Channel Impulse Response (CIR) with a corresponding weight defined by a window shape.

In still other implementations, determining a frequency domain channel estimate by transforming the radio channel estimation with a Fast Fourier Transform (FFT).

In one exemplary case, the maximum delay spread is based on a relative spread of one or more window weights from a previous channel estimation. In one such example, the method includes: replacing the performed radio channel estimation after a designated number of subframes with a second radio channel estimation based on a Minimum Mean Squared Estimation (MMSE). Further still, the designated number of subframes may be based, at least in part, on a time constant of an Infinite Impulse Response (IIR) filter.

An apparatus is disclosed. In one embodiment, the apparatus includes a network interface, a processor, and a non-transitory computer readable storage medium with at least one computer program stored thereon. The at least one computer program configured to, when executed on the processor, cause the apparatus to: interrupt communication with a first network for a first duration, based at least in part on the length of the first duration, determine an appropriate channel estimation window characterized by a window shape and a window length, and perform channel estimation in accordance with the determined appropriate channel estimation window.

In one variant, the appropriate channel estimation window is selected from a multi-tiered scheme, the multi-tiered scheme comprising increasingly conservative channel estimation techniques associated with longer tune away durations.

In another variant, the at least one computer program is further configured to, when executed on the processor, cause the apparatus to determine interpolation coefficients for a filter.

In still another variant, the at least one computer program is further configured to, when executed on the processor, cause the apparatus to: update a concurrently executed secondary channel estimation measurement based on the performed channel estimation.

In a fourth variant, the at least one computer program is further configured to, when executed on the processor, cause the apparatus to replace a concurrently executed secondary channel estimation measurement with one or more results of the channel estimation.

In some implementations, the appropriate channel estimation window is determined based on a weighted distribution and a window length, the window length determined by a noise estimate and a maximum delay spread.

Another apparatus is disclosed. In one embodiment, the apparatus includes: a network interface; a first logic configured to interrupt the network interface for a first duration; a second logic configured to determine a windowing length and a windowing shape for channel estimation based, at least in part, on the first duration; and a third logic configured to perform channel estimation in accordance with the determined window length and windowing shape. In some variants, the apparatus may further include a fourth logic configured to update one or more concurrently executed secondary channel estimation measures based on the results of the performed channel estimation.

A method of operating a base station is disclosed. In one embodiment, the method includes: determining a duration of an interruption between a mobile device and the base station; when the determined duration is less than a first threshold, perform a radio channel estimation based, at least in part, on an initial window length and an initial window shape, where the initial window length and the initial window shape were determined prior to the interruption between the mobile device and the base station; and when the determined duration is greater than the first threshold perform the radio channel estimation using at least one weighted distribution based, at least in part, on a second window length, the second window length determined, at least in part, by a noise estimate and a maximum delay spread.

A base station is disclosed. In one embodiment, the base station includes: a network interface; a processor; and a non-transitory computer readable apparatus having a storage medium with at least one computer program stored thereon. In one embodiment, the at least one computer program is configured to, when executed on the processor, cause the base station to: determine a duration of interruption between the base station and a mobile device; determine an adjustment parameter for use in a channel estimation measurement, based on the determined duration of interruption; and perform channel estimation in accordance with the determined adjustment parameter.

A base station is disclosed. In one embodiment, the base station includes: a network interface; a first logic configured to determine a duration of interruption between the base station and a mobile device; a second logic configured to determine an appropriate window length and an appropriate window shape based on the duration of interruption, where the determined appropriate window length and appropriate window shape produce more conservative channel estimates as the duration of interruption increases; and a third logic to perform channel estimation in accordance with the appropriate window length and the appropriate window shape.

Other features and advantages of the present disclosure will immediately be recognized by persons of ordinary skill in the art with reference to the attached drawings and detailed description of exemplary embodiments as given below.

All Figures © Copyright 2012-2013 Apple Inc. All rights reserved.

DETAILED DESCRIPTION

Reference is now made to the drawings, wherein like numerals refer to like parts throughout.

Detailed Description of Exemplary Embodiments

Exemplary embodiments of the present disclosure are now described in detail. While these embodiments are primarily discussed in the context of Long Term Evolution (LTE), Universal Mobile Telecommunications System (UMTS), Code Division Multiple Access 1x (CDMA 1x) cellular networks, and CDMA 1x EVDO (Evolution Data Optimized) technology, it will be recognized by those of ordinary skill that the present disclosure is not so limited, and can be used with other cellular technologies such as (and without limitation) TD-LTE (Time-Division Long-Term Evolution), TD-LTE-Advanced, TD-SCDMA (Time Division Synchronous Code Division Multiple Access), WCDMA/HSPA, and Global System for Mobile Communications (GSM). In fact, the various described embodiments are useful in combination with any network (cellular, wireless, or otherwise) that can benefit from resumption of radio channel measurements and estimations after an interruption in reception.

Overview

As indicated above, there is a need for methods and apparatus are needed to improve resumption of radio channel measurements and estimations after an interruption in reception. Accordingly, in one embodiment, when a user equipment (UE) tunes away or reception is interrupted from a connection to its current network, channel estimates are not available for the period during which the UE was tuned away (lacked reception). In order to estimate the channel, the UE assumes a channel model in order to determine the best window for channel estimation that minimizes performance degradation. In some cases, the best window is the last used window for channel estimation, however in other circumstances an adaptive window may be selected e.g., depending on the length of the interruption period, Doppler effects, etc.

Channel Estimation—

Figure 1:
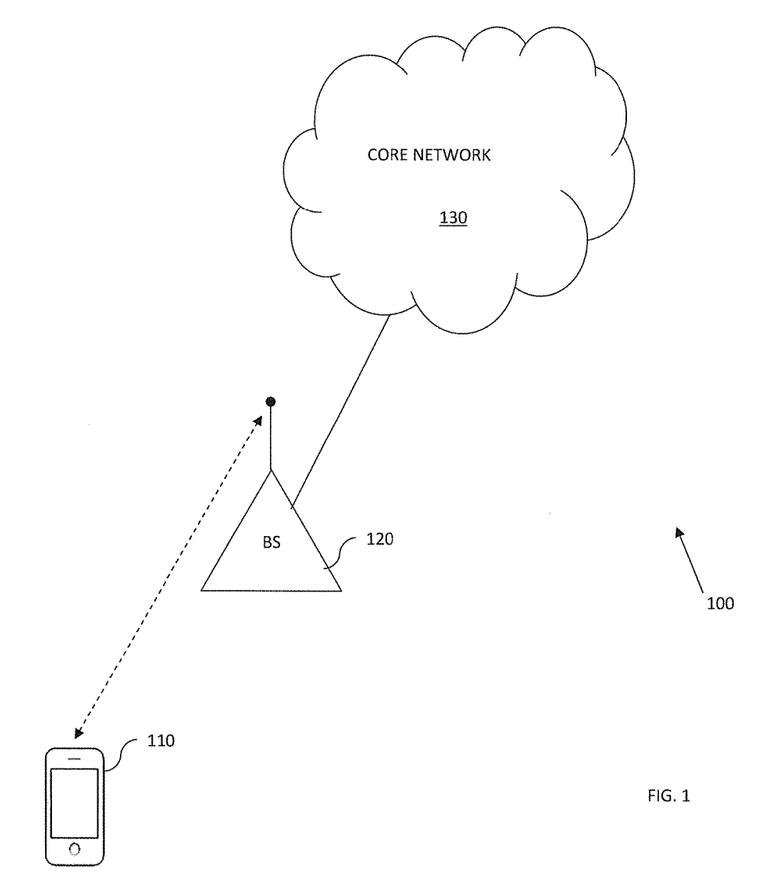
FIG. 1 is a logical block diagram illustrating one exemplary Long Term Evolution (LTE) cellular network, useful in accordance with various embodiments of the present disclosure.

FIG. 1 illustrates one exemplary Long Term Evolution (LTE) cellular network 100, with user equipment (UEs) 110, operating within the coverage of the Radio Access Network (RAN) provided by a number of base stations (BSs) 120. The LTE base stations are commonly referred to as "Evolved NodeBs" (eNBs). The Radio Access Network (RAN) is the collective body of eNBs along with interfaces to other network elements such as mobility management entities (MME) and serving gateways (S-GW). The user interfaces to the RAN via the UE, which in many typical usage cases is a cellular phone or smartphone. However, as used herein, the terms "UE", "client device", and "user device" may include, but are not limited to, cellular telephones, smartphones (such as for example an iPhone® manufactured by the Assignee hereof), personal computers (PCs) and mini-computers, whether desktop, laptop, or otherwise, as well as mobile devices such as handheld computers, tablets, PDAs, personal media devices (PMDs), or any combinations of the foregoing.

Each of the eNBs 120 are directly coupled to the Core Network 130 e.g., via broadband access. Additionally, in some networks the eNBs may coordinate with one another, via secondary access. The Core Network provides both routing and service capabilities. For example, a first UE connected to a first eNB can communicate with a second UE connected to a second eNB, via routing through the Core Network. Similarly, a UE can access other types of services e.g., the Internet, via the Core Network.

While the following discussion is made in relation to the exemplary LTE network of FIG. 1, it is further appreciated that, in light of this disclosure, the present disclosure may be applied to myriad wireless technologies including, inter glia, cellular technologies such as 3G and 4G technologies (e.g. GSM, UMTS, CDMA, CDMA2000, WCDMA, EV-DO, 3GPP standards, LTE, LTE-A, EDGE, GPRS, HSPA, HSPA+, HSPDA, and/or HSPUA, etc.); or wireless local/wide area network technologies, such as Wi-Fi (IEEE 802.11a/b/g/n/s/v), WiMAX (IEEE 802.16), or even. PAN (e.g., 802.15).

As shown in FIG. 1, the wireless links between the UE 110 and the BSs 120 are affected by unique and unpredictable radio conditions. To combat the deleterious effects of the radio channel, the UE performs channel estimation, the results of channel estimation can be used to amplify and/or attenuate various portions of the received signal so as to reconstruct the originally transmitted signal. There are two distinct methods for channel estimation: time domain channel estimation, and frequency domain channel estimation. Time domain and frequency domain channel estimation algorithms are mathematical identities and theoretically yield identical results; choice of algorithm is typically dictated by design implementation constraints, etc.

Figure 2:
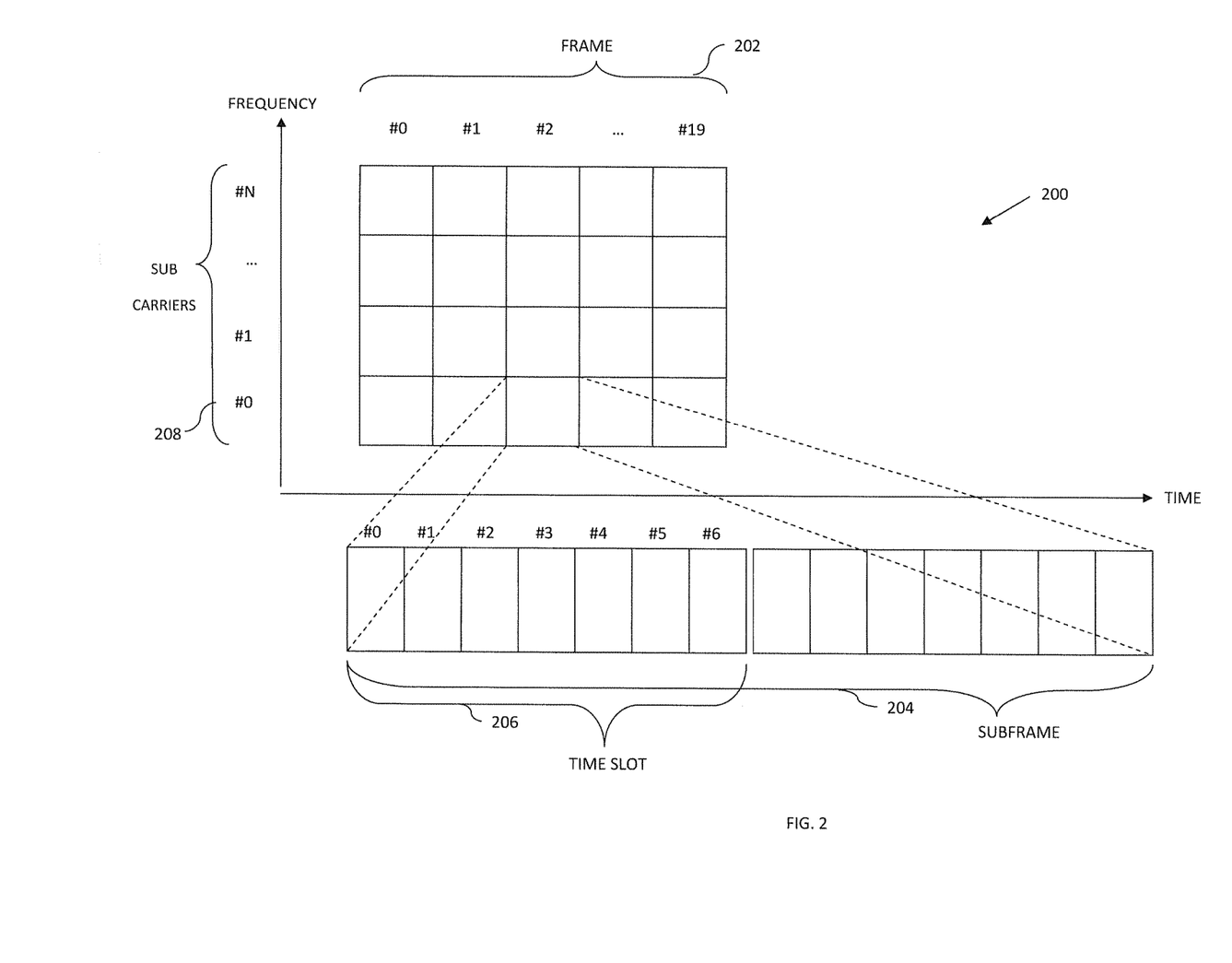
FIG. 2 is a logical representation of an Orthogonal Frequency Division Multiple Access (OFDMA) radio link, useful in accordance with various embodiments of the present disclosure.

As a brief aside, FIG. 2 illustrates one exemplary representation of an Orthogonal Frequency Division Multiple Access (OFDMA) radio link. As shown, the network bandwidth is a frequency band which has been divided in both time and frequency increments. Time has been subdivided into 10 ms frames 202, each frame consists of twenty (20) subframes 204 (numbered #0 to #19); where each subframe consists of two (2) time slots 206 (numbered #0, #1); and each time slot consists of seven (7) symbols (numbered #0 to #6). The entire frequency band is split into "sub-carriers" 208. LTE data is transferred according to this time-frequency "grid."

Certain time-frequency elements are reserved for transmitting so-called "pilot" tones. Pilot tones are deterministic patterns which the UE can detect, characterize, and interpolate the channel estimate for the entire frequency band. Pilot tones are generated according to a specific sequence.

Exemplary frequency domain channel estimation and time domain channel estimation techniques are discussed hereinafter.

In one typical frequency domain channel estimation scheme, the pilot tones are filtered and interpolated over the entire frequency band. Specifically, in one implementation, a filter is applied to the least-squares channel estimates of the pilot tones (where the pilot tones are transmitted on a number of subcarriers that are interspersed throughout the entire frequency band). The filter is mathematically configured to smooth and reduce noise, and interpolate the channel estimates for the other subcarriers (which may carry data and/or control information) based on the known channel estimates for the pilot tones. The filter coefficients are determined based on noise levels and a Power Delay Profile (PDP), where the PDP represents the intensity of a signal received through a multipath channel as a function of time delay. In one exemplary embodiment, the interpolation filter coefficients are determined based on a so-called "Wiener" filter which employs a Minimum Mean Squared Error (MMSE) technique in combination with the PDP and the noise variance, such as is described within "Two-dimensional pilot-symbol-aided channel estimation by Wiener filtering," to P. Hoeher, S. Kaiser and P. Robertson, IEEE Intl. Conf. Acoustics, Speech, and Signal Processing (ICASSP'97), Munich, Germany, pp. 1845-1848, April 1997 incorporated by reference in its entirety.

In contrast, a typical time domain scheme bases the time domain channel estimation on a window of raw time domain pilot tone channel estimates (or Channel Impulse Response (CIR)) that are multiplied by window and are transformed with a Fast Fourier Transform (FFT) to determine the frequency domain channel estimate. As previously noted, the time domain channel estimates return mathematically identical results to its frequency domain counterpart; i.e., they return an interpolated channel estimate for the total frequency band. In one exemplary implementation, the window coefficients are determined based on the Wiener window which employs a Minimum Mean Squared Error (MMSE) technique in combination with the PDP and the noise variance.

Both frequency domain channel estimation and time domain channel estimation for the total frequency band are based on channel estimates of the pilot tones; thus, inaccurate pilot tone channel estimates will propagate errors to the overall channel estimate. For this reason, if the UE has incomplete (or incorrect) pilot tone channel estimate information, the resulting overall performance can greatly suffer.

Within this context, consider a UE that occasionally experiences interruptions in (LTE) network service. UEs can be interrupted for a variety of reasons. For example, during so-called Discontinuous Reception (DRX)) a UE that is unused for a designated interval will power down (into a sleep mode) to reduce its power consumption, and power back up at a later time to retrieve any data queued for it (waking up).

In another such example, the UE may periodically tune the RF chain to a frequency carrier different from its current LTE network frequency carrier to investigate and measure performance of other nearby LTE networks and/or Radio Access Technologies (RATs). Typically, during these measurement gaps, the UE cannot monitor its current LTE network. For similar reasons, the UE may periodically tune away from its current LTE network to other networks. For example, a device tunes away from an LTE network to periodically check a CDMA 1× network for paging messages, etc. By periodically tuning into both networks, the UE can effectively camp on two (2) networks simultaneously.

As previously alluded to, interruption events often result in degraded performance. While the client device reception is interrupted, the radio channel continues to change; once the client device resumes normal operation, the device has to recover the new channel estimate quickly. Moreover, the client device cannot gather any reception information during the reception interruptions, thus existing filter elements etc. may be incorrectly configured. Accordingly, existing solutions generally implement a "reset" clause or routine to start afresh, rather than trying to overcome the difficulties associated with reconciling the new channel estimate with previous channel estimate data, etc.

Methods—

Figure 3:
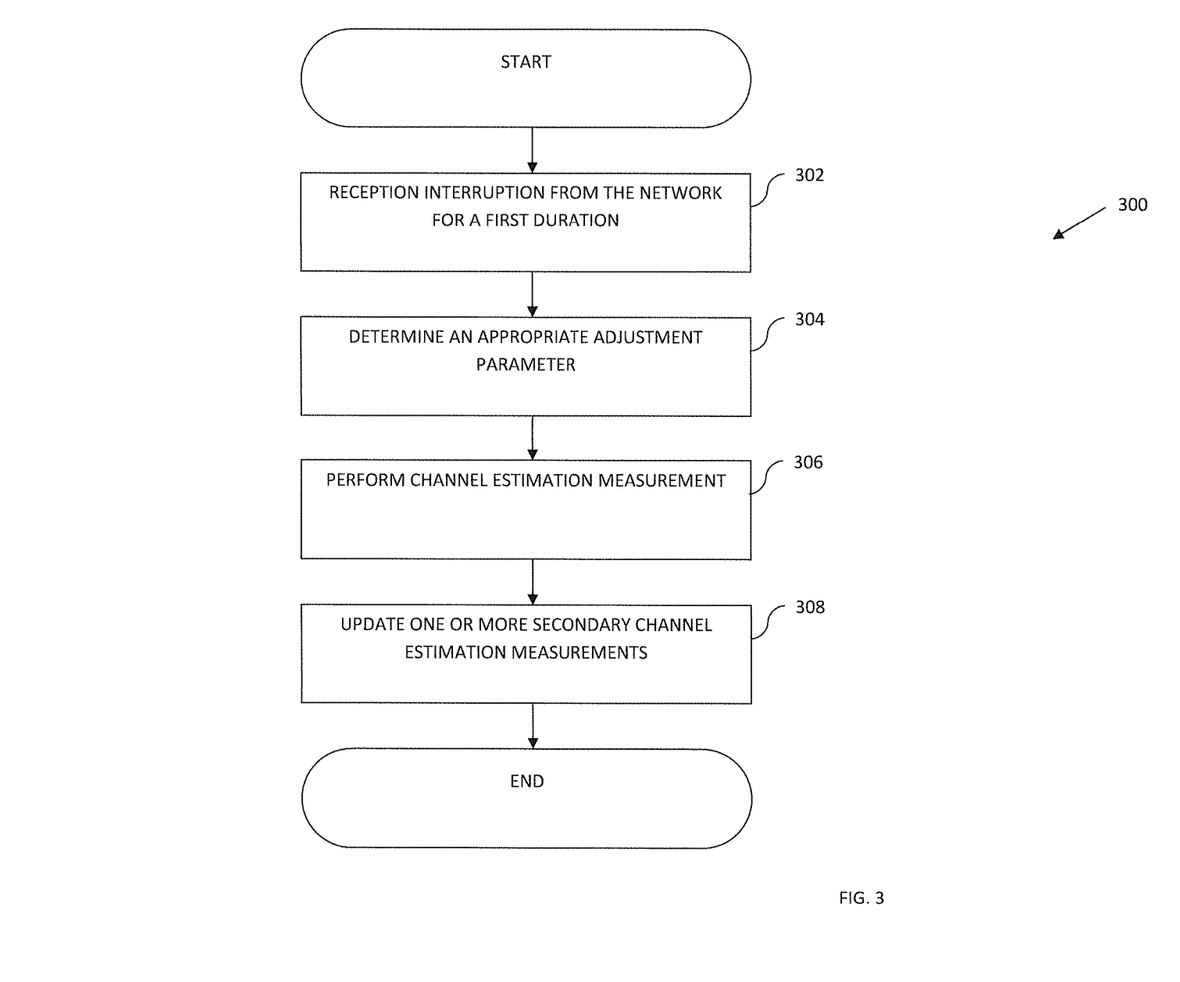
FIG. 3 is a logical flow diagram of a generalized method for resuming radio channel measurements and estimations after a momentary interruption in reception according to the present disclosure.

Referring now to FIG. 3, one embodiment of a generalized method for resuming radio channel measurements and estimations after an interruption in reception, is shown and described in detail. In one exemplary embodiment, an adaptive solution is provided for channel estimation based at least in part on the reception interruption duration. In one variant, an LTE UE determines a windowing length and/or "shape" for a time domain channel estimation algorithm based on the reception interruption duration. In an alternate variant, an LTE UE determines the interpolation coefficients for a filter based on the reception interruption duration. Advantageously, the methods described herein can accommodate reception interruption durations ranging from an instantaneous or momentary period, to those lasting appreciably longer.

At step 302 of the method 300 of FIG. 3, the client device experiences a reception interruption from the network for a first duration.

In one embodiment, the interruption period is based on so-called Discontinuous Reception (DRX)) where the client device powers down to reduce its power consumption (sleep mode), and powers back up at a later time to retrieve any data queued for it (waking up). In other cases, the client device may periodically tune away from its current network to investigate and measure performance of other nearby networks and/or Radio Access Technologies (RATs).

Examples of tune away operation are described within co-owned, co-pending U.S. patent application Ser. No. 13/475,482 filed on May 18, 2012, and entitled "APPARATUS AND METHODS FOR CLIENT SERVER INTERACTION IN HYBRID NETWORK ENVIRONMENTS", Ser. No. 13/475,655 filed on May 18, 2012, and entitled "APPARATUS AND METHODS FOR OPTIMIZING SCHEDULED OPERATIONS IN HYBRID NETWORK ENVIRONMENTS", Ser. No. 13/475,802 filed May 18, 2012, and entitled "APPARATUS AND METHODS FOR NETWORK ASSISTED HYBRID NETWORK OPERATION", Ser. No. 13/416,286 filed Mar. 9, 2012, and entitled "DUAL NETWORK MOBILE DEVICE RADIO RESOURCE MANAGEMENT", Ser. No. 13/099,204 filed May 2, 2011, and entitled "SINGLE-RADIO DEVICE SUPPORTING COEXISTENCE BETWEEN MULTIPLE RADIO ACCESS TECHNOLOGIES", Ser. No. 13/438,666 filed Apr. 3, 2012, and entitled "MULTIPLE NETWORK MOBILE DEVICE CONNECTION MANAGEMENT", Ser. No. 13/346,419 filed Jan. 9, 2012, and entitled "DYNAMIC TRANSMIT CONFIGURATIONS IN DEVICES WITH MULTIPLE ANTENNAS", and Ser. No. 13/347,641 filed Jan. 10, 2012, and entitled "MULTIMODE USER EQUIPMENT WITH DUAL CIRCUIT ARCHITECTURE", previously incorporated by reference in their entireties. For example, in one embodiment during hybrid network operation (e.g., LTE and CDMA 1× operation), a mobile device can tune away from an LTE network to check CDMA 1× pages, measure CDMA 1× performance, etc.

At step 304, based on (at least) the length of the first duration, the client device determines an appropriate adjustment parameter and/or configuration for use in a first channel estimation measurement.

In one embodiment, the duration is based on a timer. For example, during an interruption event, the client device can start a timer (or alternately note the time). When the client device resumes the communication, the elapsed duration is used to determine the adjustment parameter/configuration.

In some cases, the interruption event duration may be a fixed interval. For example, where a device is powering down for a sleep cycle, the sleep cycle has a known time interval. Similarly, it is appreciated that certain tasks may have a deterministic (or relatively deterministic) time. Consider paging channel operation: if a page is detected, then the interruption event duration may be unpredictable; otherwise, when the device is not being paged, the duration of the interruption event is predictable.

In one exemplary embodiment, the client device selects the appropriate parameter(s) and/or configuration based on one or more "tiered" or hierarchical thresholds for time durations. For instance, a given duration falling into a first tier of such hierarchy may dictate use of a first set of parameters/configurations, while a duration falling into the second tier dictates a second (different) set.

Other parameters which the client device may consider include e.g., movement, reception quality, historic behavior, etc. Those of ordinary skill in the related arts will readily appreciate that factors such as movement and reception quality can greatly affect the nature of channel estimation. For example, in some variants, Doppler shift may be used to infer a relative velocity of the device. In other variants, if the channel estimate is poor prior to the interruption event then the device may default to a more conservative window selection, whereas if the channel estimate is good prior to the interruption event then the device may default to a more precise window selection.

More generally it should be appreciated that a conservative window selection will provide less heavily weighted channel estimation over a wider range (longer window). In contrast, an aggressive window selection will result in better channel estimates over a shorter window (where the channel has not appreciably changed).

Common examples of parameters/configurations include, without limitation: window length, window shape, window type, algorithm type, filter weights, filter configurations, level of confidence, duration, etc.

At step 306 of the method 300, the client device performs the channel estimation measurement in accordance with the determined appropriate adjustment parameter(s) and/or configuration.

In another implementation of the method, the client device (e.g., UE) may additionally update one or more concurrently executing secondary channel estimation measurements based on the results of a primary channel estimation measurement (step 308).

Example Operation—

Figure 4:
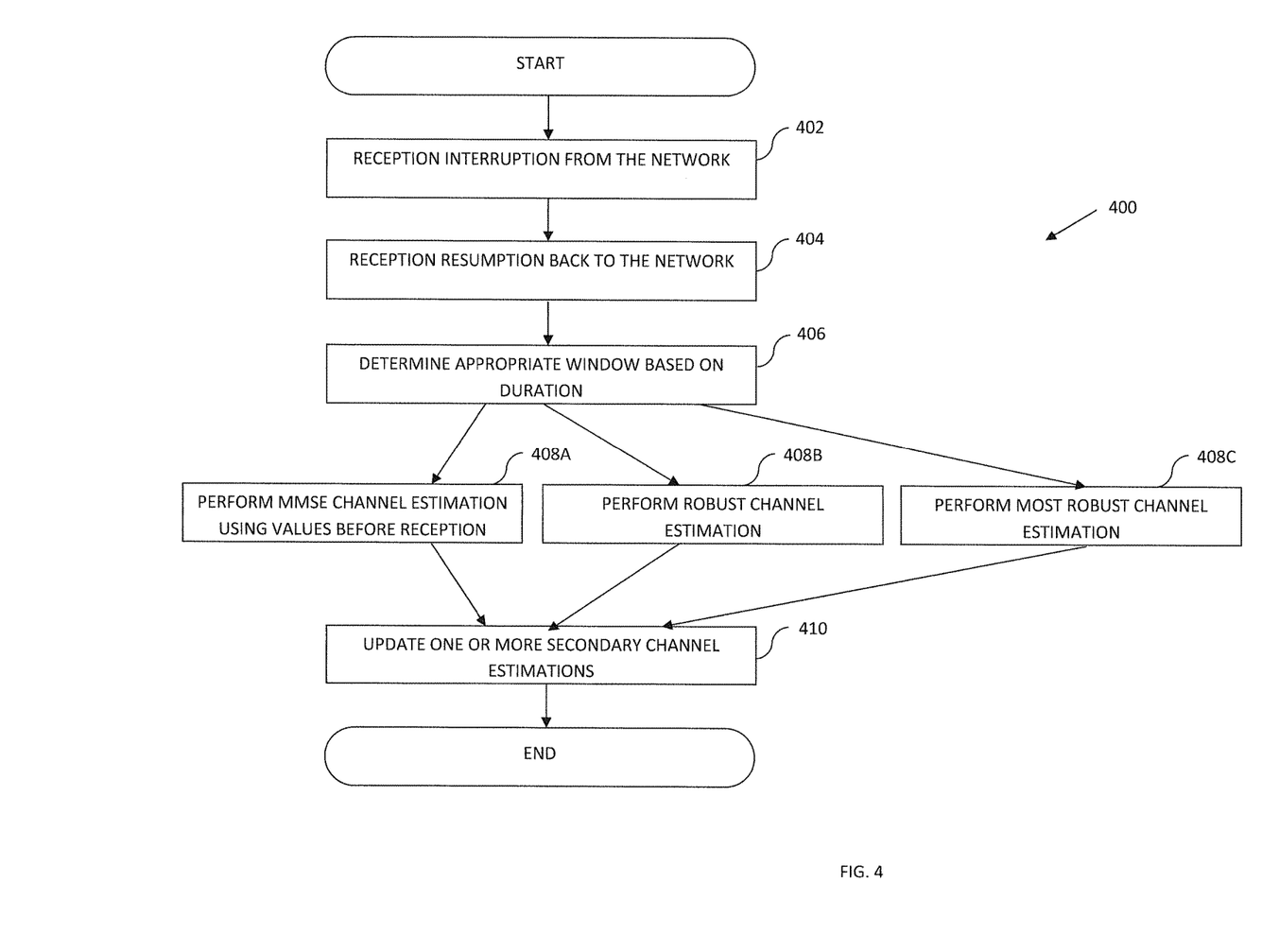
FIG. 4 is a logical flow diagram of an exemplary method for resuming radio channel measurements and estimations after a momentary interruption in reception in accordance with the generalized method of FIG. 3.

Referring now to FIG. 4, one exemplary implementation 400 of the general method 300 described supra for channel estimation (i.e., based at least in part on the reception interruption duration) is shown and described.

At step 402 of the method 400, a Long Term Evolution (LTE) User Equipment (UE) configured to perform time domain channel estimation tunes away from its current LTE network for a first time duration, and then returns at step 404.

Based on the length of the first duration, the LTE UE determines an appropriate window length and window shape for performing time domain channel estimation (step 406). In one embodiment, the LTE UE selects the appropriate window length and window shape based on a three (3)-tier scheme: (i) shorter than a first threshold, (ii) longer than a first threshold and shorter than a second threshold, and (iii) longer than the second threshold.

If the duration is less than a first threshold (step 408A), then the window length and window shape are left unchanged from the configuration before the tune away period. The first threshold time is selected to balance the relative gains in performance with the complexity of correction. In other words, the first threshold is selected to minimize unnecessary processing effort where the relative gains in improved channel estimation performance are small. Accordingly, in common implementations, the first threshold will typically be set at a comparatively short value.

If the tune-away duration is more than the first threshold value, but shorter than a second threshold value (step 408B), then the window shape is set to one of a plurality of possible weighted distributions (e.g., Gaussian, exponential, Hamming, evenly weighted, etc.), and the window length is determined by a noise estimate and the maximum delay spread (if the current maximum delay spread is not available, the maximum delay spread may be reused from the previous channel estimation results). The second threshold time is selected in the exemplary implementation to balance the (computational) complexity of correction with a likelihood of successfully completing channel estimation. For example, channel estimation is based on the UE's reception of the pilot tones; if the radio environment is changing too rapidly (such as during rapid movement, etc.), the UE may miss significant portion of the energy of the pilot tones, resulting in unrecoverable errors.

In one exemplary variant, the selection of the first and second thresholds is based on a measured Doppler shift. Doppler shift is a phenomenon caused by the relative velocity between a transmitter and a receiver; thus, larger Doppler shifts result in lower (more stringent) thresholds, whereas a smaller Doppler shift results in higher (more forgiving) thresholds. Doppler shift measurement and compensation is well known in the related arts and is not further discussed.

Finally, if the duration is more than the second threshold (step 408C), then the window shape is set to an evenly weighted window and the window length is set to the cyclic prefix of the OFDM system. This configuration provides a conservative channel estimation method, since no channel paths are missed but the noise smoothing capabilities are reduced.

Figure 5:
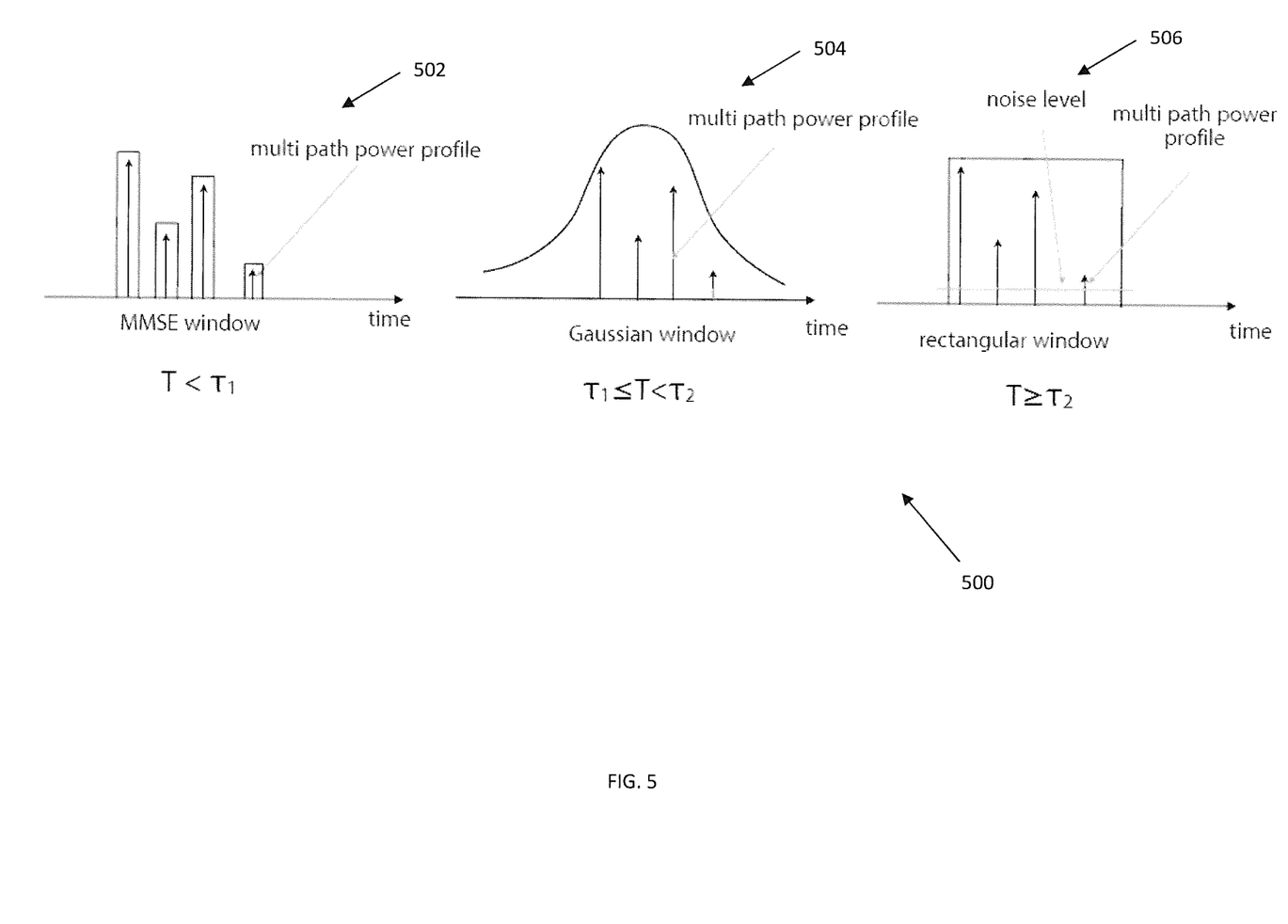
FIG. 5 is a graphical illustration of three exemplary radio channel measurements, useful in accordance with various embodiments of the present disclosure.

Referring now to FIG. 5, a graphical illustration of the various window lengths and window shapes for performing time domain channel estimation are provided. As shown, the Minimum Mean Squared Estimation (MMSE) window 502 is applicable for operation below the first threshold. The MMSE approach measures the power of each path of a multipath power profile (determined from the power of the received pilot tones). Each MMSE weight is multiplied element-wise by each time domain sample of the Channel Impulse Response (CIR). Existing schemes for determining a CIR from the pilot tones are based on a Least Square Estimate (LSE) technique which is well known in the related arts and is not further discussed.

To implement the MMSE, the weight of each sample is given by Eqn. 1:

$$w_{MMSE,i} = \frac{SNR_i}{SNR_i + 1} = \frac{P_i}{P_i + N_o} \quad \text{(Eqn. 1)}$$

Where:
$P_i$=the power profile of the multipath at the i-th filter tap location; and
$N_o$=the measured noise level.

Those of ordinary skill in the related arts will recognize that $P_i$ and $N_o$ can be determined based on coherent and or non-coherent filtering measurements.

It is of particular note that the exemplary MMSE window 502 has very narrow windows, thus the MMSE provides high quality results when the UE is closely time aligned, but can be completely inaccurate where the UE has drifted even slightly in alignment (which is more likely to occur for longer tune away periods) or if the channel has rapidly changed but the MMSE window was not updated quickly enough to track that change.

Accordingly, for moderate amounts of drift which may be expected to occur between the first threshold and the second threshold, a robust window (such as the illustrated Gaussian distribution) 504 is used to more heavily weight each time domain sample of the Channel Impulse Response (CIR) which is generally centered close to the expected multipath. This window is continuous in its nature compared to the MMSE that might be more discrete depending on the channel profile, SNR conditions, etc.

Several considerations are used to determine an appropriate Gaussian window. For example, the width of the Gaussian window may be based on the relative spread of the MMSE window weights from previous channel estimation activities, and/or the relative noise level.

Finally, where the UE has tuned away so long that there is a high likelihood that the CIR has significantly changed from previous measurements, the UE can implement another window (e.g., evenly weighted sampling window) over the entire cyclic prefix 506. The exemplary evenly weighted window evenly weights all CIR samples, thus the evenly weighted window has significantly lower accuracy than either the MMSE window 502, or the robust window 504. However, the evenly weighted window none-the-less provides better performance than prior art solutions which simply restart channel acquisition.

Referring back to FIG. 4, while the foregoing embodiment provides significant benefits over prior art solutions, in a further embodiment, the client device may additionally update one or more concurrently executing secondary channel estimation measurements based on the results of a primary channel estimation measurement (step 410). Concurrent operation of primary and secondary channel estimation process is computationally expensive, but may appeal to certain classes of consumers (e.g., power users, etc.).

Thus, after resumption (step 404), both a primary and secondary channel estimation process is started. The primary channel estimation continues the method of FIG. 4 (i.e., determines an appropriate window length and window shape for performing time domain channel estimation, etc.), and the secondary channel estimation performs legacy MMSE channel estimation in parallel and discards the results. The secondary channel estimation is further updated with the results of the primary channel estimation. For example, if the primary channel estimation has a robust window, the secondary channel estimation will converge within K subframes (where K is the time constant of the Infinite Impulse Response (IIR) filter used in the channel estimation window tracking loop).

Specifically, as represented within Eqn. 2:

$$w_{mmse,i}(0) = w_{gauss,i} \quad \text{(Eqn. 2)}$$

$$w_{mmse,i}(l) = \alpha \frac{F(P_i(l))}{F(P_i(l) + N_0)} + (1 - \alpha)w_{mmse,i}(l - 1)$$

Where:
I=multipath tap index of the IIR filter;
l=the subframe number; and
F( )=the filtering operation for signal and signal and noise power estimates for an MMSE window computation (generally a 1-tap IIR filter with a time coefficient α)

In this variation, the coefficient of the robust window can additionally be used as an initial starting MMSE weight in the adaptation loop of the secondary channel estimation process given by the following Eqn. 3:

$$w_{mmse,i}(l) = w_{gauss,i} \text{ for } l = 0, \ldots, K - 1 \quad \text{(Eqn. 3)}$$

$$w_{mmse,i}(l) = u_{mmse,i}(l) \text{ for } l \geq K$$

$$u_{mmse,i}(l) = \frac{F(P_i(l))}{F(P_i(l) + N_0)}$$

Appendix A herein describes an exemplary particular LTE-based implementation of the foregoing.

Apparatus—

Figure 6:
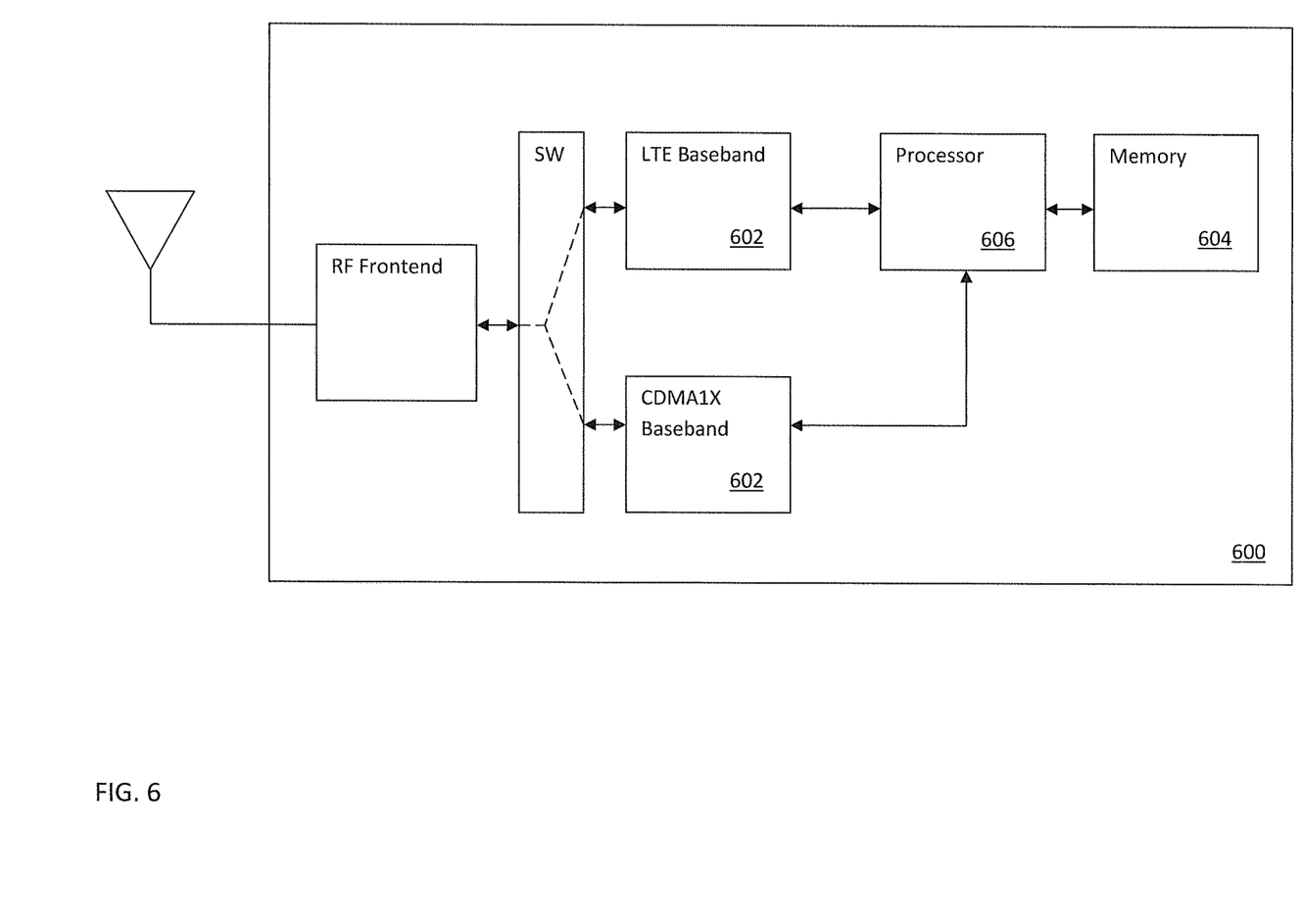
FIG. 6 is a functional block diagram of an exemplary embodiment of a wireless client device.

Referring now to FIG. 6, an exemplary user device 600 configured to adaptively resume channel estimation is illustrated. As used herein, the term "user device" includes, but is not limited to cellular telephones, smartphones (such as for example an iPhone®), personal computers (PCs), such and minicomputers, whether desktop, laptop, or otherwise, as well as mobile devices such as handheld computers, PDAs, video cameras, set-top boxes, personal media devices (PMDs), wireless-enabled tablet devices, or any combinations of the foregoing. While one specific device configuration and layout is shown and discussed herein, it is recognized that many other configurations may be readily implemented by one of ordinary skill given the present disclosure, the apparatus 600 of FIG. 6 being merely illustrative of the broader principles.

The apparatus 600 of FIG. 6 includes one or more radio transceivers 602, a computer readable memory 604, and a processing subsystem 606.

The processing subsystem 606 includes one or more of central processing units (CPU) or digital processors, such as a microprocessor, digital signal processor, field-programmable gate array, RISC core, or plurality of processing components mounted on one or more substrates. The processing subsystem is coupled to computer readable memory 604 (i.e., a computer readable storage medium), which may include for example SRAM, FLASH, SDRAM, and/or HDD (Hard Disk Drive) components. As used herein, the texas "memory" and "computer readable storage medium" include any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM. The processing subsystem may also comprise additional co-processors, such as a dedicated graphics accelerator, network processor (NP), or audio/video processor. As shown, the processing subsystem 606 includes discrete components; however, it is understood that in some embodiments they may be consolidated or fashioned in e.g., a SoC (system-on-chip) configuration.

The processing subsystem 606 is adapted to receive one or more data streams from a radio transceiver 602. The radio transceiver generally comprises in this exemplary embodiment a cellular radio transceiver, but others may be readily substituted. The radio transceiver comprises one or more components configured to perform channel estimation and resumption of channel estimation in accordance with the aforementioned methods.

Myriad of other schemes for adaptively resuming channel estimation will be recognized by those of ordinary skill given the present disclosure.

It will also be appreciated that while the various embodiments described herein are discussed primarily in the context of a client device (e.g., UE), at least portions of the foregoing functionality can conceivably be implemented by another UE or even a network-side entity. For example, calculations supporting determination of the appropriate channel estimation or window length/shape parameters can be off-loaded or delegated to other entities or processes, or can be based on data obtained from other entities (such as nearby UE's experiencing similar channel conditions).

It will be recognized that while certain embodiments are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure as disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. The foregoing description is of the best mode presently contemplated. This description is in no way meant to be limiting, but rather should be taken as illustrative of the general principles. The scope of the disclosure should be determined with reference to the claims.

What is claimed is:

1. A method of performing radio channel estimation after an interruption in reception between a mobile device and a network, comprising:
at the mobile device:
determining a duration of the interruption in reception;
determining a channel estimation window, wherein the channel estimation window is characterized by a channel estimation window length and a channel estimation window shape, wherein determining the channel estimation window comprises:
determining a previous channel estimation window that the mobile device used prior to the interruption in reception between the mobile device and the network;
determining an adjustment parameter for the previous channel estimation window based at least in part on the duration of the interruption;
adapting the previous channel estimation window based on the adjustment parameter to create the channel estimation window;
performing channel estimation in accordance with the adapted channel estimation window.

2. The method of claim 1, wherein determining the channel estimation window further comprises:
when the determined duration is less than a first threshold:
the channel estimation window length comprises a first channel estimation window length; and
the channel estimation window shape is determined before the interruption in reception;
when the determined duration is greater than the first threshold and less than a second threshold:
the channel estimation window length comprises a second channel estimation window length and is based at least in part on a noise estimate and a maximum delay spread; and
the channel estimation window shape is based at least on an unevenly weighted distribution; and
when the determined duration is greater than the second threshold:
the channel estimation window length comprises a third channel estimation window length and is based at least in part on a characteristic of a radio channel of the network; and
the channel estimation window shape comprises a third channel estimation window shape and is based at least in part on an evenly weighted distribution.

3. The method of claim 1, further comprising updating a secondary channel estimate based, at least in part, on the performed radio channel estimation.

4. The method of claim 2, wherein the first threshold and the second threshold are based, at least in part, on a Doppler shift.

5. The method of claim 1, wherein performing a radio channel estimation comprises multiplying a Channel Impulse Response (CIR) with a corresponding weight defined by a window shape.

6. The method of claim 1, further comprising determining a frequency domain channel estimate by transforming the radio channel estimation with a Fast Fourier Transform (FFT).

7. The method of claim 1, wherein the maximum delay spread is based on a relative spread of one or more window weights from the previous channel estimation.

8. The method of claim 7, further comprising replacing the performed radio channel estimation after a designated number of subframes with a second radio channel estimation based on a Minimum Mean Squared Estimation (MMSE).

9. The method of claim 8, wherein the designated number of subframes is based, at least in part, on a time constant of an Infinite Impulse Response (IIR) filter.

10. The method of claim 2, wherein the unevenly weighted distribution comprises at least one of a Gaussian distribution, an exponential distribution, or a Hamming distribution.

11. An apparatus comprising:
a network interface;
a processor; and
a non-transitory computer readable storage medium with at least one computer program stored thereon, the at least one computer program configured to, when executed on the processor, cause the apparatus to:
interrupt communication with a first network for a first duration;
determine an appropriate channel estimation window characterized by a window shape and a window length, wherein determining the appropriate channel estimation window comprises:
determine a previous channel estimation window that was used prior to the interruption in communication with the first network;
determine an adjustment parameter for the previous channel estimation window based at least in part on the duration of the interruption;
adapt the previous channel estimation window based on the adjustment parameter to create the appropriate channel estimation window;
perform channel estimation in accordance with the adapted appropriate channel estimation window.

12. The apparatus of claim 11, wherein the interrupted communication comprises a tune away event from the first network.

13. The apparatus of claim 11, wherein the adjustment parameter is selected from a multi-tiered scheme, the multi-tiered scheme comprising increasingly conservative channel estimation techniques associated with longer tune away durations.

14. The apparatus of claim 11, wherein the at least one computer program is further configured to, when executed on the processor, cause the apparatus to determine interpolation coefficients for a filter.

15. The apparatus of claim 11, wherein the at least one computer program is further configured to, when executed on the processor, cause the apparatus to:
update a concurrently executed secondary channel estimation measurement based on the performed channel estimation.

16. The apparatus of claim 11, wherein the at least one computer program is further configured to, when executed on the processor, cause the apparatus to replace a concurrently executed secondary channel estimation measurement with one or more results of the channel estimation.

17. The apparatus of claim 11, wherein the appropriate channel estimation window is determined, in part, based on a weighted distribution and a window length, the window length determined in part, by a noise estimate and a maximum delay spread.

18. The apparatus of claim 11, wherein the at least one computer program is further configured to, when executed on the processor, cause the apparatus to perform channel estimation in accordance with the appropriate channel estimation window such that:
when the first duration is greater than a first threshold and less than a second threshold:
the window shape is based at least in part on a second channel estimation window shape based at least in part on an unevenly weighted distribution, and
the window length is based at least in part on a second channel estimation window length based at least in part on a noise estimate and a maximum delay spread; and
when the first duration is greater than the second threshold:
the window shape is based at least in part on a third channel estimation window shape based at least in part on an evenly weighted distribution; and
the window length is based at least in part on a third channel estimation window length based at least in part on a characteristic of a radio channel of the network.

19. A base station comprising:
a network interface;
a processor; and
a non-transitory computer readable storage medium having a storage medium with at least one computer program stored thereon, the at least one computer program configured to, when executed on the processor, cause the base station to:
determine a duration of interruption between the base station and a mobile device;
determine a previous channel estimation window that the mobile device used prior to the interruption between the base station and the mobile device;
determine an adjustment parameter for the previous channel estimation window, based on the determined duration of interruption;
adapt previous channel estimation window based on the adjustment parameter to create an appropriate channel estimation window; and
perform channel estimation in accordance with the appropriate channel estimation window.

20. The base station of claim 19, wherein the at least one computer program is further configured to, when executed on the processor, cause the base station to update one or more concurrently executed secondary channel estimation measurements based on the results of the performed channel estimation.

21. The base station of claim 19, wherein the at least one computer program is further configured to, when executed on the processor, cause the base station to perform channel estimation in accordance with the appropriate channel estimation window such that:
when the determined duration is greater than a first threshold, the determined adjustment parameter is based at least on a weighted distribution based at least in part on a second window length, where the second window length is determined at least in part, by a noise estimate and a maximum delay spread.

* * * * *

UNITED STATES PATENT AND TRADEMARK OFFICE
CERTIFICATE OF CORRECTION

PATENT NO. : 9,967,112 B2
APPLICATION NO. : 13/887207
DATED : May 8, 2018
INVENTOR(S) : Tabet et al.

Page 1 of 1

It is certified that error appears in the above-identified patent and that said Letters Patent is hereby corrected as shown below:

On the Title Page

Item (72), inventor's residence information:
"Syed Aon Mujtaba, San Clara, CA (US)" should read "Syed Aon Mujtaba, Santa Clara, CA (US)"

In the Claims

Claim 1, Column 14, Line 31:
"adapted channel estimation window." should read "channel estimation window."

Claim 11, Column 15, Line 42:
"adapted appropriate channel estimation window." should read "appropriate channel estimation window."

Claim 17, Column 16, Lines 2-3:
"length determined in part, by a noise estimate and a maximum delay spread." should read "length determined, in part, by a noise estimate and a maximum delay spread."

Signed and Sealed this
Fourth Day of June, 2019

Andrei Iancu
*Director of the United States Patent and Trademark Office*